United States Patent
Bae et al.

(10) Patent No.: US 11,722,355 B2
(45) Date of Patent: Aug. 8, 2023

(54) APPARATUS AND METHOD FOR TRANSMITTING AND RECEIVING 4-LAYER LAYERED-DIVISION MULTIPLEXING SIGNAL

(71) Applicant: ELECTRONICS AND TELECOMMUNICATIONS RESEARCH INSTITUTE, Daejeon (KR)

(72) Inventors: Jae-Hwui Bae, Daejeon (KR); Young-Su Kim, Sejong (KR); Dong-Joon Choi, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 209 days.

(21) Appl. No.: 17/220,659

(22) Filed: Apr. 1, 2021

(65) Prior Publication Data
US 2021/0336837 A1    Oct. 28, 2021

(30) Foreign Application Priority Data
Apr. 22, 2020    (KR) .................... 10-2020-0048953

(51) Int. Cl.
*H04L 27/34*    (2006.01)
*H04L 1/00*    (2006.01)
*H04J 99/00*    (2009.01)

(52) U.S. Cl.
CPC .......... *H04L 27/3488* (2013.01); *H04J 99/00* (2022.08); *H04L 1/0071* (2013.01)

(58) Field of Classification Search
CPC ..... H04L 27/3488; H04L 1/0071; H04J 99/00
See application file for complete search history.

(56) References Cited

U.S. PATENT DOCUMENTS

| | | | |
|---|---|---|---|
| 9,985,747 B2 | 5/2018 | Baek et al. | |
| 10,404,351 B2* | 9/2019 | Seo | ............ H04B 7/14 |
| 10,778,817 B2* | 9/2020 | Lim | ...................... H04L 69/324 |
| 11,177,895 B2 | 11/2021 | Michael | |

(Continued)

FOREIGN PATENT DOCUMENTS

| | | | | |
|---|---|---|---|---|
| CN | 114285712 A | * | 4/2022 | ............. H04J 11/00 |
| EP | 2200242 A1 | | 6/2010 | |

(Continued)

*Primary Examiner* — Freshteh N Aghdam

(57) ABSTRACT

Disclosed herein are an apparatus and method for transmitting and receiving a 4-layer layered-division multiplexing (LDM) signal. An apparatus for transmitting a 4-layer layered-division multiplexing signal includes a layered-division multiplexing modulation unit for generating a 3-layer layered-division multiplexing signal by performing layered-division multiplexing modulation on three layer signals and generating a 4-layer layered-division multiplexing signal by inserting a Pseudo-random Noise (PN) sequence into the 3-layer layered-division multiplexing signal, a pilot insertion unit for inserting a pilot into the 4-layer layered-division multiplexing signal, and a transmission unit for transmitting the 4-layer layered-division multiplexing signal.

16 Claims, 18 Drawing Sheets

(56) References Cited

U.S. PATENT DOCUMENTS

| | | | |
|---|---|---|---|
| 2015/0358106 A1* | 12/2015 | Limberg | H04L 1/0045 |
| | | | 375/320 |
| 2016/0286488 A1 | 9/2016 | Simon | |
| 2017/0279648 A1* | 9/2017 | Song | H04L 27/2618 |
| 2018/0324485 A1 | 11/2018 | Kim | |
| 2019/0116079 A1 | 4/2019 | Simon | |
| 2021/0258199 A1 | 8/2021 | Simon | |

FOREIGN PATENT DOCUMENTS

| | | | | |
|---|---|---|---|---|
| JP | 2022006358 A | * | 1/2022 | |
| KR | 10-0662424 B1 | | 1/2007 | |
| KR | 10-2010-0071810 A | | 6/2010 | |
| KR | 10-1058939 B1 | | 8/2011 | |
| KR | 10-2018-0005608 A | | 1/2018 | |
| KR | 10-2019-0050971 A | | 5/2019 | |
| KR | 10-1979854 B1 | | 8/2019 | |
| KR | 10-2020-0033990 A | | 3/2020 | |
| WO | WO-2020026899 A1 | * | 2/2020 | H03M 13/1105 |

* cited by examiner

EL NUC 64-QAM CONSTELLATION

QPSK +NUC 64QAM LDM SIGNAL CONSTELLATION

APPARATUS AND METHOD FOR TRANSMITTING AND RECEIVING 4-LAYER LAYERED-DIVISION MULTIPLEXING SIGNAL

CROSS REFERENCE TO RELATED APPLICATION

This application claims the benefit of Korean Patent Application No. 10-2020-0048953, filed Apr. 22, 2020, which is hereby incorporated by reference in its entirety into this application.

BACKGROUND OF THE INVENTION

1. Technical Field

The present invention relates generally to technology for transmitting and receiving a Layered-Division Multiplexing (LDM) signal and, more particularly, to technology for transmitting and receiving a 4-layer LDM signal.

2. Description of the Related Art

Layered-Division Multiplexing (LDM) is one example of transmission multiplexing technology for providing different reception robustness levels, and has been developed to provide higher transmission efficiency than that of existing Time-Division Multiplexing (TDM) or Frequency Division Multiplexing (FDM).

Here, in LDM modulation technology, 2-layer LDM modulation technology is composed of a Core Layer (CL) and an Enhanced Layer (EL). Each of a CL and an EL transmits two physical layer pipes (PLP) having different transmission power levels, modulation types, and channel coding rates through a single Radio Frequency (RF) bandwidth.

Further, in LDM modulation technology, 3-layer LDM modulation is configured to perform 3-layer modulation by adding an Amplitude Shift Keying (ASK) modulation signal between a CL and an EL in 2-layer LDM modulation. A 3-layer LDM modulation signal obtained in this way is composed of a first layer, which is an Upper Layer (UL), a second layer, which is a Middle Layer (ML), and a third layer, which is a Lower layer (LL).

However, in existing 3-layer LDM modulation, a combination of UL, ML, and LL signal magnitudes has almost reached a receivable limit. Therefore, when a fourth layer signal corresponding to new modulation is added, it is very difficult to be able to receive the fourth layer signal that is newly added while being able to normally receive UL, ML, and LL signals corresponding to existing 3-layer LDM modulation. In order to prevent the newly added fourth layer signal from influencing the UL, ML, and LL signals corresponding to existing 3-layer LDM modulation, the magnitude of the newly added fourth layer signal must be very small. However, when the magnitude of the newly added fourth layer signal is excessively small, it is very difficult to receive the fourth layer signal. In contrast, when the newly added fourth layer signal has the sufficient magnitude to be received, the fourth layer signal acts as noise, so that a problem arises in that the strength of noise is increased from the standpoint of the existing 3-layer LDM signal, thus making it difficult to receive a 3-layer LDM modulation signal.

Meanwhile, Korean Patent Application Publication No. 10-2018-0005608 entitled "Apparatus for Generating Broadcast Signal frame using Enhanced Layer Physical Layer Pipe and Method using the same" relates to broadcasting signal transmission/reception technology used in a broadcasting system and discloses a broadcast signal transmission/reception system which uses time interleaving.

SUMMARY OF THE INVENTION

Accordingly, the present invention has been made keeping in mind the above problems occurring in the prior art, and an object of the present invention is to perform 4-layer Layered-Division Multiplexing (LDM) modulation by adding a new signal to a 3-layer LDM signal.

Another object of the present invention is to transmit and receive a 4-layer LDM signal in which a new signal is added to a 3-layer LDM signal without influencing transmission/reception performance of the 3-layer LDM signal.

A further object of the present invention is to transmit and receive a 4-layer LDM signal at a very low Signal-to-Noise Ratio (SNR) and to apply the 4-layer LDM signal to mobile transmission and reception.

In accordance with an aspect of the present invention to accomplish the above objects, there is provided an apparatus for transmitting a 4-layer Layered-Division Multiplexing (LDM) signal, including a LDM modulation unit for generating a 3-layer LDM signal by performing layered-division multiplexing modulation on three layer signals and generating a 4-layer LDM signal by inserting a Pseudo-random Noise (PN) sequence into the 3-layer LDM signal; a pilot insertion unit for inserting a pilot into the 4-layer LDM signal; and a transmission unit for transmitting the 4-layer LDM signal.

The LDM modulation unit may insert the PN sequence into a data subcarrier of the 3-layer LDM signal.

The LDM modulation unit may insert an asterion of a Binary Phase Shift Keying (BPSK) constellation of the PN sequence into at least one asterion of a constellation of the 3-layer LDM signal.

The LDM modulation unit may be configured to, when the PN sequence includes multiple PN sequences, determine a transfer rate of a modulation order of Quadrature Amplitude Modulation (QAM) corresponding to a number of PN sequences to be a transfer rate of the 4-layer LDM signal.

In accordance with another aspect of the present invention to accomplish the above objects, there is provided a method for transmitting a 4-layer Layered-division Multiplexing (LDM) signal, including generating a 3-layer LDM signal by performing layered-division multiplexing modulation on three layer signals and generating a 4-layer LDM signal by inserting a Pseudo-random Noise (PN) sequence into the 3-layer LDM signal; inserting a pilot into the 4-layer LDM signal; and transmitting the 4-layer LDM signal.

Generating the 3-layer LDM signal may be configured to insert the PN sequence into a data subcarrier of the 3-layer LDM signal.

Generating the 3-layer LDM signal may be configured to insert an asterion of a Binary Phase Shift Keying (BPSK) constellation of the PN sequence into at least one asterion of a constellation of the 3-layer LDM signal.

Generating the 3-layer LDM signal may be configured to, when the PN sequence includes multiple PN sequences, determine a transfer rate of a modulation order of Quadrature Amplitude Modulation (QAM) corresponding to a number of PN sequences to be a transfer rate of the 4-layer LDM signal.

In accordance with a further aspect of the present invention to accomplish the above objects, there is provided an apparatus for receiving a 4-layer Layered-division Multiplexing (LDM) signal, including a reception unit for receiving a 4-layer LDM signal; a PN sequence detection unit for detecting a PN sequence from the 4-layer LDM signal, and cancelling the PN sequence from the 4-layer LDM signal; and an LDM demodulation unit for reconstructing a 3-layer LDM signal, in which the PN sequence is cancelled from the 4-layer LDM signal, into three layer signals.

The PN sequence detection unit may detect the PN sequence from the 4-layer LDM signal by calculating a correlation between the 4-layer LDM signal and the PN sequence.

The PN sequence detection unit may cancel the PN sequence from the 4-layer LDM signal using a successive interference cancellation (SIC) technique.

The PN sequence detection unit may be configured to, when the PN sequence includes multiple PN sequences, calculate correlation values between the multiple PN sequences and the 4-layer LDM signal, and determine a PN sequence corresponding to a maximum correlation value, among the correlation values, to be the detected PN sequence.

The sequence detection unit may be configured to, when the PN sequence includes multiple PN sequences, calculate correlation values between the multiple PN sequences and the 4-layer LDM signal, and determine a PN sequence corresponding to a correlation value equal to or greater than a preset correlation value, among the correlation values, to be the detected PN sequence.

The PN sequence detection unit may reconstruct the 3-layer LDM signal by cancelling a signal component of the PN sequence, calculated by multiplying a preset injection level and a channel estimation vector by the PN sequence, from the 4-layer LDM signal.

The LDM demodulation unit may reconstruct an Amplitude Shift Keying (ASK)-modulated second layer signal, using a magnitude of a Quadrature Phase Shift Keying (QPSK)-modulated first layer signal, among the three layer signals in the 3-layer LDM signal.

The LDM demodulation unit may re-modulate the first layer signal and the second layer signal and reconstruct a third layer signal, among the three layer signals, by cancelling the re-modulated first layer signal and second layer signal from the 3-layer LDM signal using a successive interference cancellation (SIC) technique.

In accordance with yet another aspect of the present invention to accomplish the above objects, there is provided a method for receiving a 4-layer Layered-Division Multiplexing (LDM) signal, the method being performed by a 4-layer LDM signal reception apparatus, the method including receiving a 4-layer LDM signal; detecting a PN sequence from the 4-layer LDM signal and cancelling the PN sequence from the 4-layer LDM signal; and reconstructing a 3-layer LDM signal, in which the PN sequence is cancelled from the 4-layer LDM signal, into three layer signals.

Cancelling the PN sequence may be configured to detect the PN sequence from the 4-layer LDM signal by calculating a correlation between the 4-layer LDM signal and the PN sequence.

Cancelling the PN sequence may be configured to cancel the PN sequence from the 4-layer LDM signal using a successive interference cancellation (SIC) technique.

Cancelling the PN sequence may be configured to, when the PN sequence includes multiple PN sequences, calculate correlation values between the multiple PN sequences and the 4-layer LDM signal, and determine a PN sequence corresponding to a maximum correlation value, among the correlation values, to be the detected PN sequence.

Cancelling the PN sequence may be configured to, when the PN sequence includes multiple PN sequences, calculate correlation values between the multiple PN sequences and the 4-layer LDM signal, and determine a PN sequence corresponding to a correlation value equal to or greater than a preset correlation value, among the correlation values, to be the detected PN sequence.

Cancelling the PN sequence may be configured to reconstruct the 3-layer LDM signal by cancelling a signal component of the PN sequence, calculated by multiplying a preset injection level and a channel estimation vector by the PN sequence, from the 4-layer LDM signal.

Reconstructing the 3-layer LDM signal into the three layer signals may be configured to reconstruct an Amplitude Shift Keying (ASK)-modulated second layer signal, using a magnitude of a Quadrature Phase Shift Keying (QPSK)-modulated first layer signal, among the three layer signals in the 3-layer LDM signal.

Reconstructing the 3-layer LDM signal into the three layer signals may be configured to re-modulate the first layer signal and the second layer signal and to reconstruct a third layer signal, among the three layer signals, by cancelling the re-modulated first layer signal and second layer signal from the 3-layer LDM signal using a successive interference cancellation (SIC) technique.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
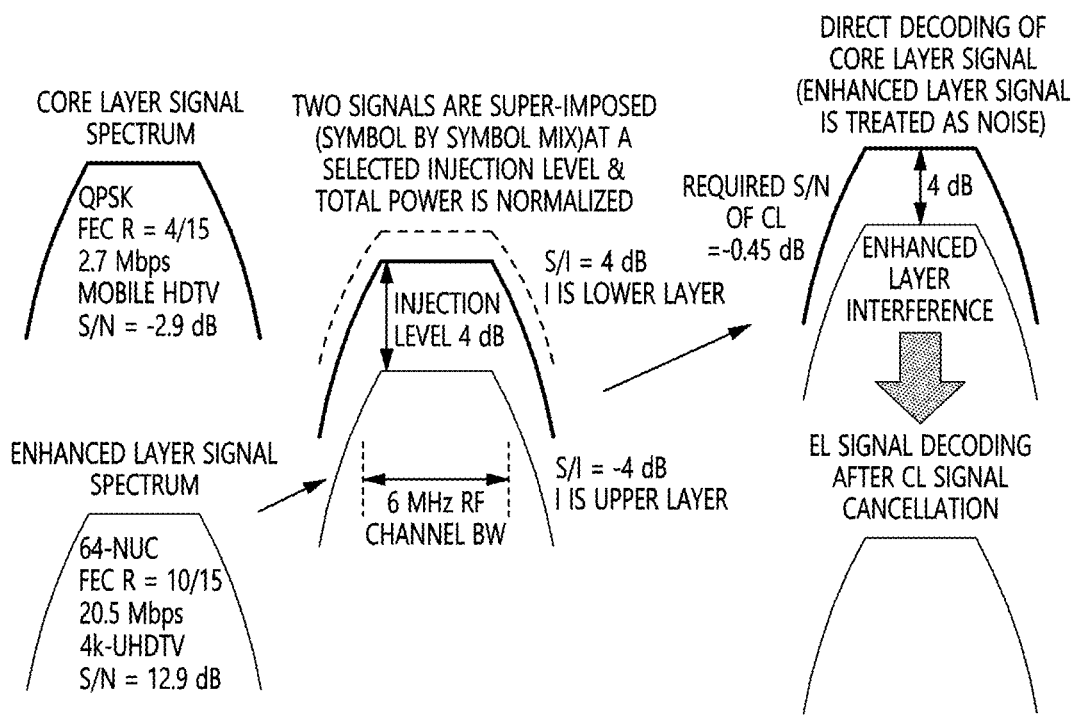
FIG. 1 is a diagram illustrating a 2-layer layered-division multiplexing modulation according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with the attached drawings.

FIG. 1 is a diagram illustrating a 2-layer layered-division multiplexing modulation according to an embodiment of the present invention.

Referring to FIG. 1, it can be seen that a 2-layer Layered-Division Multiplexing (LDM) modulation process is illustrated. As illustrated in FIG. 1, a 2-layer LDM system may transmit a signal by combining two or more Physical Layer Pipes (PLP) with each other. A signal having a higher power level in a 2-layer LDM modulation signal may be represented by a Core Layer (CL) and a signal having a lower power level may be represented by an Enhanced Layer (EL).

For transmission of two Physical Layer Pipes (PLP), 2-layer LDM modulation may apply Quadrature Phase Shift Keying (QPSK), a code rate of channel code of CR=4/15, and a Low-Density Parity Check (LDPC) code length of Ninner=64800 to a Core Layer (CL), and may apply 64-QAM, a code rate of channel code of CR=10/15, and an LDPC code length of Ninner=64800 to an EL. Reception of a 2-layer LDM modulation signal may be performed such that a CL signal may be directly demodulated from a received signal, and an EL signal may be received by cancelling the CL signal from the received signal. Therefore, in order to receive the EL signal, a CL signal component may be cancelled from the received 2-layer LDM modulation signal by demodulating and re-modulating an upper layer signal, that is, the CL signal.

Figure 2:
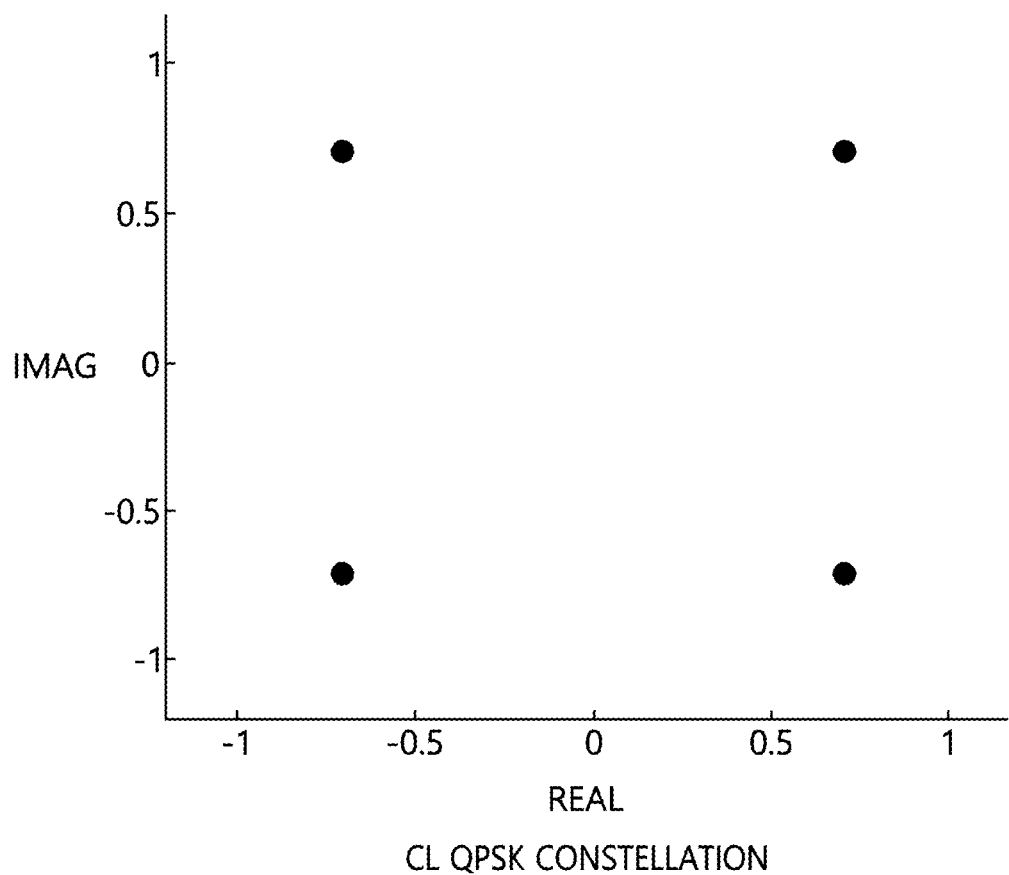
FIG. 2 is a graph illustrating a constellation of a Core Layer (CL) QPSK signal according to an embodiment of the present invention.
Figure 3:
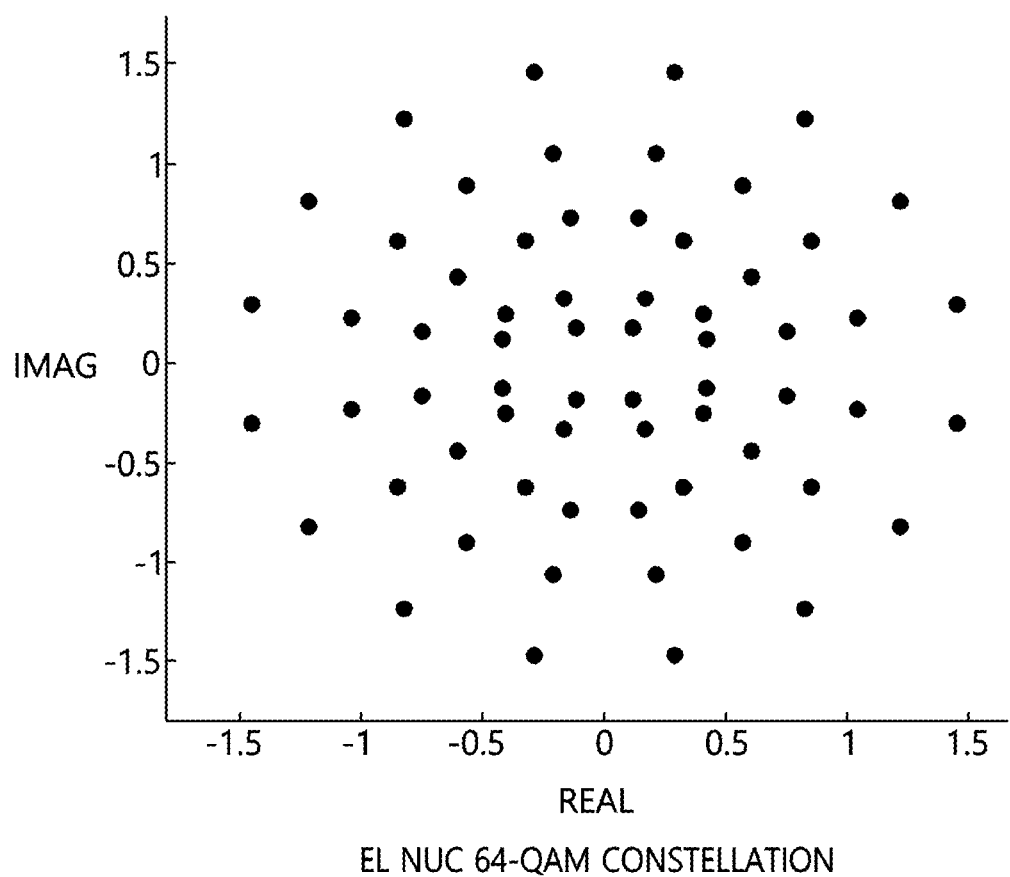
FIG. 3 is a graph illustrating a constellation of an Enhanced Layer (EL) NUC 64-QAM signal according to an embodiment of the present invention.
Figure 4:
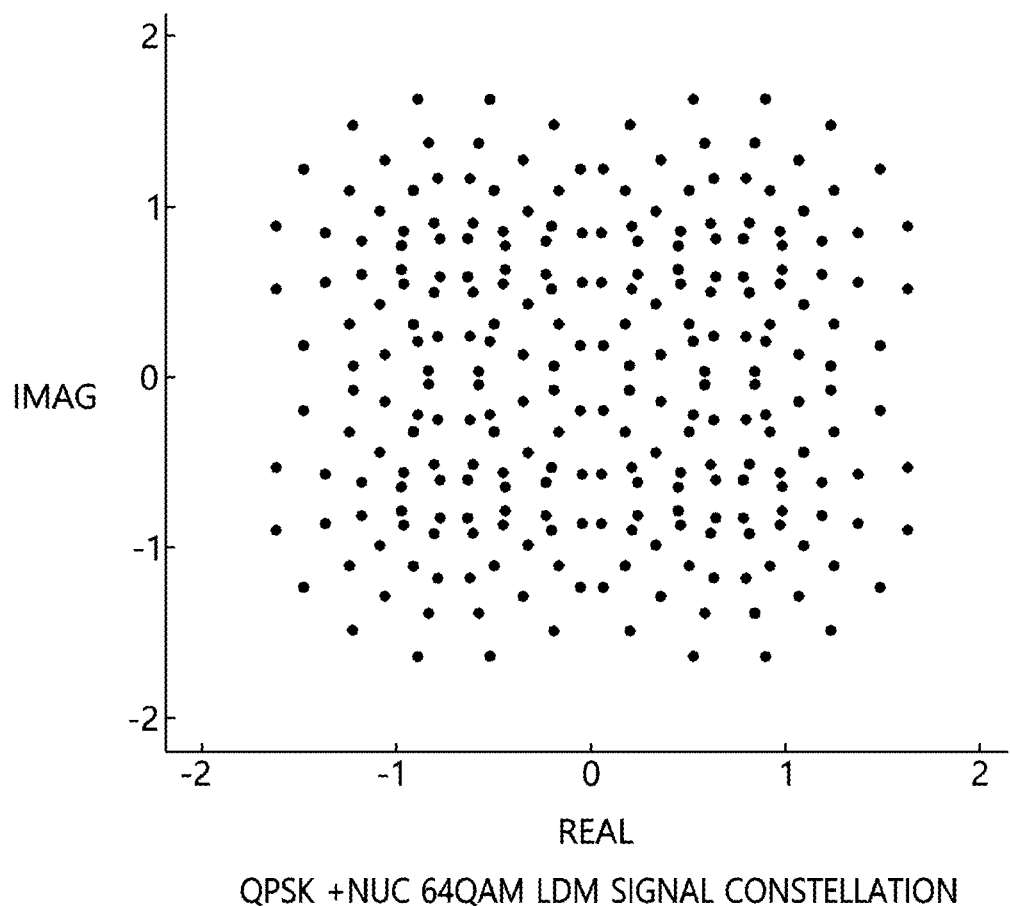
FIG. 4 is a graph illustrating a constellation of a 2-layer LDM modulation signal in which the CL QPSK signal and the EL NUC 64-QAM signal of FIGS. 2 and 3 are combined with each other.

FIG. 2 is a graph illustrating a constellation of a Core Layer (CL) QPSK signal according to an embodiment of the present invention. FIG. 3 is a graph illustrating a constellation of an Enhanced Layer (EL) NUC 64-QAM signal according to an embodiment of the present invention. FIG. 4 is a graph illustrating a constellation of a 2-layer LDM modulation signal in which the CL QPSK signal and the EL non-uniform constellation (NUC) 64-QAM signal of FIGS. 2 and 3 are combined with each other.

Referring to FIG. 2, a constellation obtained by applying a QPSK modulation scheme to a core layer (CL) is illustrated, referring to FIG. 3, a constellation obtained by applying a non-uniform constellation 64-Quadrature Amplitude Modulation (QAM) scheme to an enhanced layer (EL) is illustrated, and referring to FIG. 4, a constellation of a 2-layer LDM modulation signal in which a CL QPSK signal and an EL NUC 64-QAM signal are combined with each other is illustrated. It can be seen that the enhanced layer is inserted at signal power lower than that of the core layer by 4 dB, a set value for adjusting a power level is 0.6309573, and a normalized value for adjusting the power of a final output signal is 0.845762. In order to demodulate the LDM signal, a receiver may primarily demodulate a core layer signal, which is the strongest signal, and secondarily demodulate an enhanced layer signal after cancelling the demodulated signal from the received signal. The LDM system may obtain a quasi error free (QEF) Signal-to-Noise Ratio (SNR) gain higher than that of an existing TDM system by about 3 to 6 dB.

Figure 5:
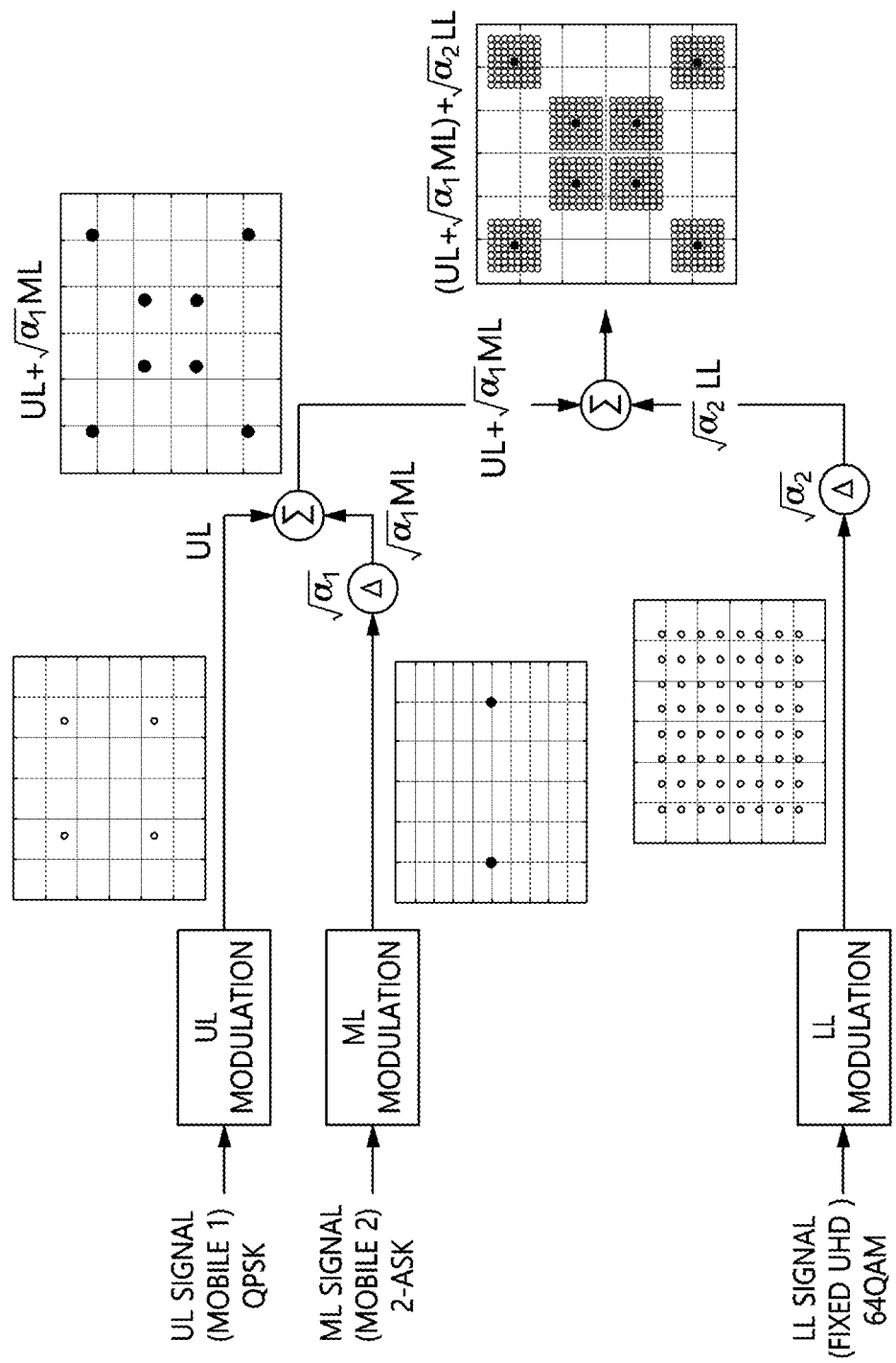
FIG. 5 is a diagram illustrating a process for generating a 3-layer layered-division multiplexing (LDM) modulation signal according to an embodiment of the present invention.

FIG. 5 is a diagram illustrating a process for generating a 3-layer layered-division multiplexing (LDM) modulation signal according to an embodiment of the present invention.

Referring to FIG. 5, Amplitude Shift Keying (ASK) modulation-based 3-layer LDM modulation may generate a 3-layer LDM signal by adding an ASK modulation signal to the above-described 2-layer LDM modulation signal. In 3-layer LDM modulation, a layer having the highest priority is defined as an upper layer (UL), a layer having the next highest priority is defined as a middle layer (ML), and a layer having the lowest priority is defined as a lower layer (LL). Here, $\alpha_1$ is an injection level applied to primary 2-layer LDM modulation of the UL and the ML, and $\alpha_2$ is an injection level applied to a primary 2-layer LDM modulation signal (UL+$\sqrt{\alpha_1}$ ML) and secondary LDM modulation of the LL.

Here, in 3-layer LDM modulation, the UL may be a CL QPSK modulation signal in 2-layer LDM modulation, the LL may be an EL 64-QAM modulation signal in 2-layer LDM modulation, and the ML may be a newly added ASK modulation signal.

In 3-layer LDM modulation, since a UL QPSK signal has a data transfer rate lower than that of the LL to which 64-QAM is applied, but has a low quasi error free (QEF) SNR, the UL QPSK signal may be highly applied to mobile broadcasting that is chiefly provided to mobile terminals. A ML ASK signal has a data transfer rate similar to that of UL or about half that of the UL, and has QEF SNR higher than that of the UL QPSK signal, but has a low value near about 10 dB. Therefore, the ML may be highly applied to mobile broadcasting that is chiefly provided to mobile terminals. A LL 64QAM has a high data transfer rate, but has QEF SNR higher than that of UL and ML, and is highly applied to UHD broadcasting service in fixed reception.

Figure 6:
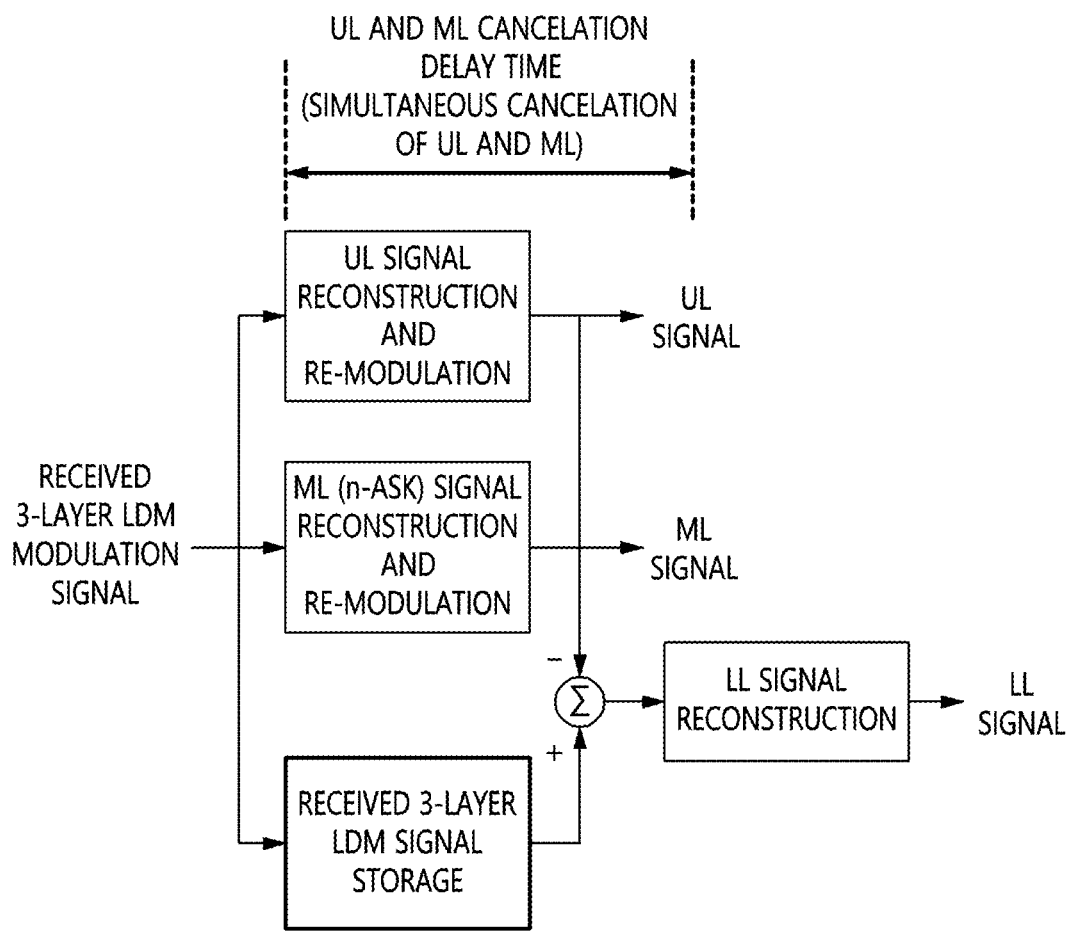
FIG. 6 is a diagram illustrating a process for demodulating a 3-layer layered division multiplexing (LDM) modulation signal according to an embodiment of the present invention.

FIG. 6 is a diagram illustrating a process for demodulating a 3-layer layered-division multiplexing (LDM) modulation signal according to an embodiment of the present invention.

Referring to FIG. 6, it can be seen that the 3-layer LDM demodulation process is performed by receiving a 3-layer LDM modulation signal in which QPSK modulation is applied to a ML.

A UL signal may be reconstructed by regarding an ML signal and an LL signal as noise.

The ML signal may be obtained by cancelling the UL signal, which is an upper layer, from the received 3-layer LDM modulation signal. Since ASK modulation applied to the ML has information only in the magnitude of a signal, it can be seen that a UL signal component is cancelled from the received 3-layer LDM modulation signal from the standpoint of the ML signal if only the signal magnitude of the UL signal is subtracted from the received 3-layer LDM modulation signal, without receiving and re-modulating a UL signal, by utilizing information indicating that the magnitude of the UL QPSK signal is "1".

It can be seen that the LL signal is reconstructed after the upper layer (UL) signal and the ML signal have been reconstructed and re-modulated and then cancelled from the received 3-layer LDM modulation signal.

A reception process in ASK-based 3-layer LDM modulation enables an UL signal and an ML signal to be simultaneously received and enables an LL signal to be reconstructed by simultaneously re-modulating the UL signal and the ML signal for the LL reception and by cancelling UL and ML signal components from the received 3-layer LDM signal. Here, in order to apply UL and ML to mobile reception, power consumption must be low in consideration of the characteristics of mobile terminals which use limited power.

Figure 7:
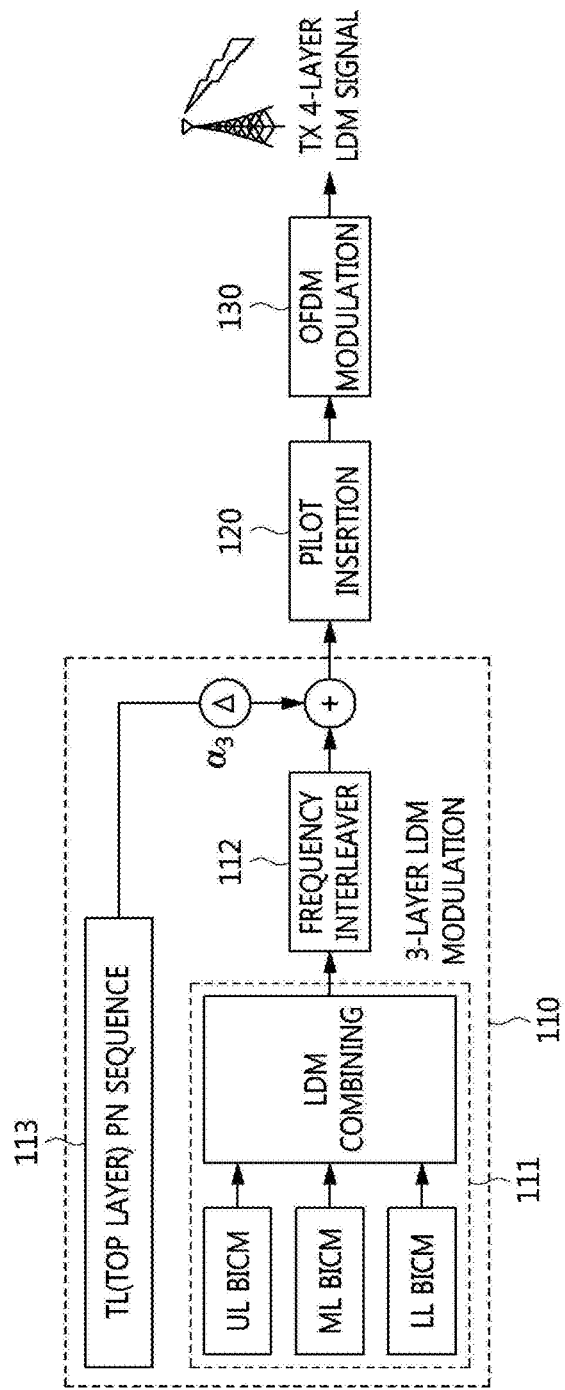
FIG. 7 is a block diagram illustrating an apparatus for transmitting a 4-layer LDM signal according to an embodiment of the present invention.
Figure 8:
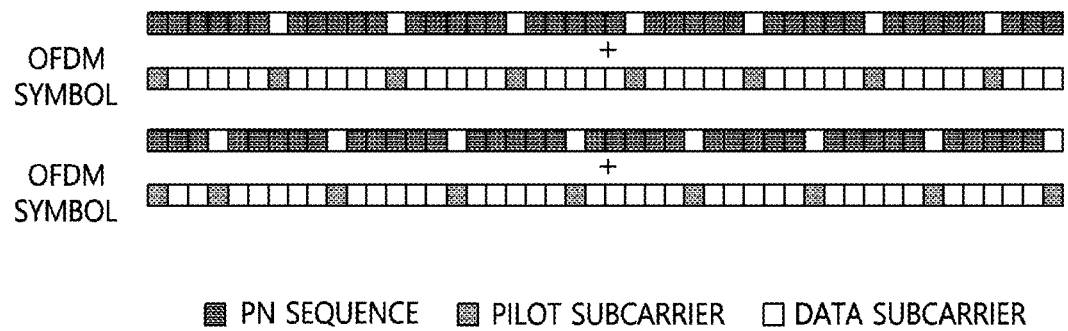
FIG. 8 is a diagram illustrating a process for adding PN sequences to an OFDM symbol according to an embodiment of the present invention.

FIG. 7 is a block diagram illustrating an apparatus for transmitting a 4-layer LDM signal according to an embodiment of the present invention. FIG. 8 is a diagram illustrating a process for adding PN sequences to an OFDM symbol according to an embodiment of the present invention.

Referring to FIG. 7, the apparatus for transmitting a 4-layer LDM signal according to the embodiment of the present invention includes an LDM modulation unit 110, a pilot insertion unit 120, and a transmission unit 130.

The LDM modulation unit 110 includes a 3-layer LDM modulation unit 111, a frequency interleaver 112, and a PN sequence generation unit 113.

The 3-layer LDM modulation unit 111 may generate a 3-layer LDM signal by performing layered-division multiplexing modulation on three layer signals.

The frequency interleaver 112 may perform frequency interleaving on the 3-layer LDM signal.

The PN sequence generation unit 113 may generate a 4-layer LDM signal by inserting pseudo-random noise (PN) sequences into the 3-layer LDM signal.

Here, the PN sequence generation unit 113 may insert PN sequences into a frequency-interleaved 3-layer LDM signal.

Here, the PN sequence generation unit 113 may insert the PN sequences into data subcarriers of the 3-layer LDM signal.

Referring to FIG. 8, the PN sequences are added from the standpoint of an OFDM symbol. Since the PN sequences are added only to data subcarriers and are not added to pilot subcarriers, it can be seen that PN sequences are not present at the positions of the pilot subcarriers.

Here, when PN sequences are added, the PN sequence generation unit 113 may add PN sequences only to data subcarriers while skipping pilot subcarriers when the PN sequences are added after pilot signals have been inserted.

Here, the PN sequence generation unit 113 may insert an asterion of the Binary Phase Shift Keying (BPSK) constellation of PN sequences into at least one asterion of a constellation of the 3-layer LDM signal.

Here, when there are multiple PN sequences, the PN sequence generation unit 113 may determine the transfer rate of the modulation order of QAM corresponding to the number of PN sequences to be the transfer rate of the 4-layer LDM signal.

The pilot insertion unit 120 may insert pilot signals into the 4-layer LDM signal.

Because pilot signals to be applied to channel estimation are inserted into the 4-layer LDM signal after the PN sequence signals have been added thereto, it can be seen that PN sequence signals are not added to the pilot signals.

Therefore, degradation of performance does not occur in the pilot signals, and thus it may be considered that channel estimation performance using pilots does not cause performance degradation.

The transmission unit 130 may transmit the 4-layer LDM signal.

Here, the transmission unit 130 may transmit the 4-layer LDM signal using an Orthogonal Frequency Division Multiplexing (OFDM) scheme.

Figure 9:
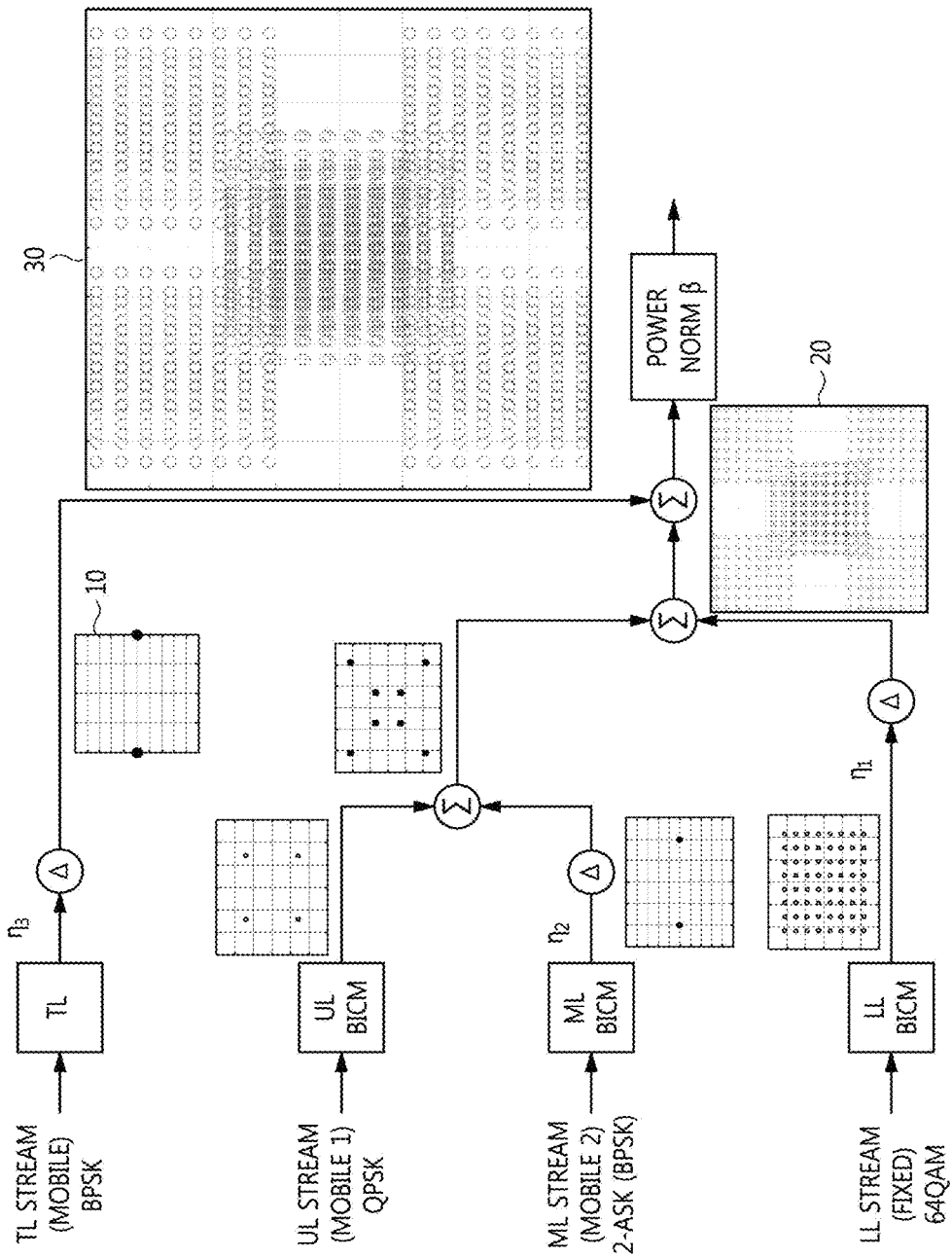
FIG. 9 is a diagram illustrating a 4-layer layered division multiplexing modulation process according to an embodiment of the present invention.
Figure 10:
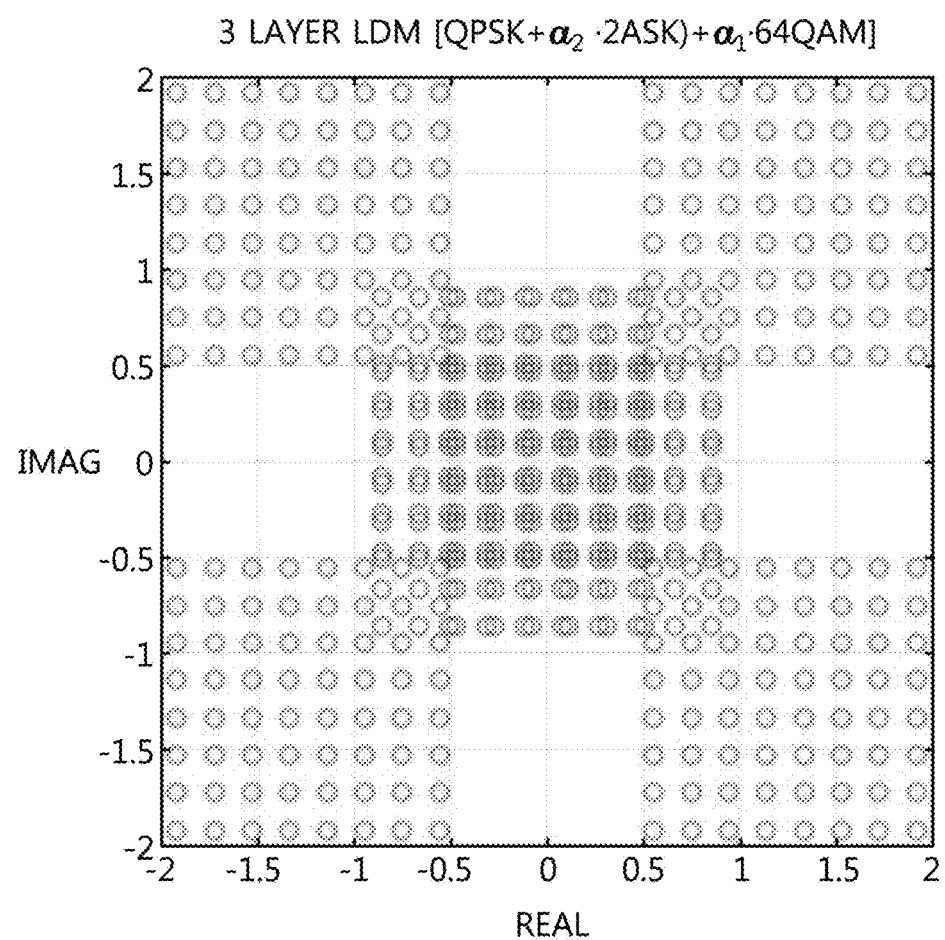
FIG. 10 is a graph illustrating a constellation of the 3-layer layered division multiplexing signal of FIG. 9.
Figure 11:
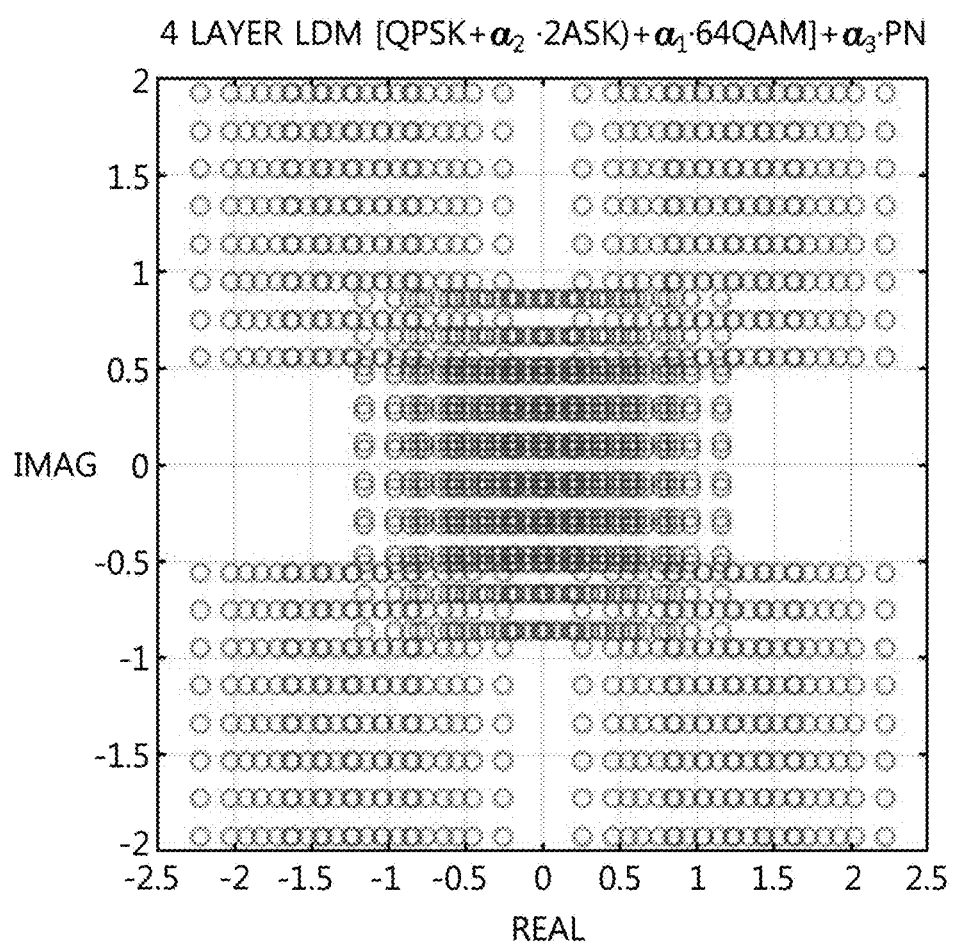
FIG. 11 is a graph illustrating a constellation of the 4-layer layered-division multiplexing signal of FIG. 9.

FIG. 9 is a diagram illustrating a 4-layer layered-division multiplexing modulation process according to an embodiment of the present invention. FIG. 10 is a graph illustrating a constellation of the 3-layer layered-division multiplexing signal of FIG. 9. FIG. 11 is a graph illustrating a constellation of the 4-layer layered-division multiplexing signal of FIG. 9.

Referring to FIG. 9, the 4-layer LDM modulation process is illustrated in detail. It can be seen that a Top Layer (TL) PN sequence has values of +1 and −1, and thus a TL PN sequence BPSK constellation 10 is illustrated. Also, it can be seen that a constellation 20 of a 3-layer LDM modulation signal, in which an UL QPSK signal, an ML 2-ASK (BPSK) signal, and an LL 64-QAM signal are combined with each other, is generated. The BPSK constellation 10 of the TL PN sequence may be combined with the constellation 20 of the 3-layer LDM modulation signal, and thus a constellation 30 of a 4-layer LDM modulation signal may be generated. The constellation 30 of the 4-layer LDM modulation signal indicates that the BPSK constellation 10 of the TL PN sequence is added to each asterion of the constellation 20 of the 3-layer LDM modulated signal, and thus the asterions of the 3-layer LDM modulation signal are slightly spread in a horizontal direction.

Referring to FIG. 10, the constellation 20 of the 3-layer LDM modulation signal is depicted in detail, and referring to FIG. 11, the constellation 30 of the 4-layer LDM modulation signal is depicted in detail.

Figure 12:
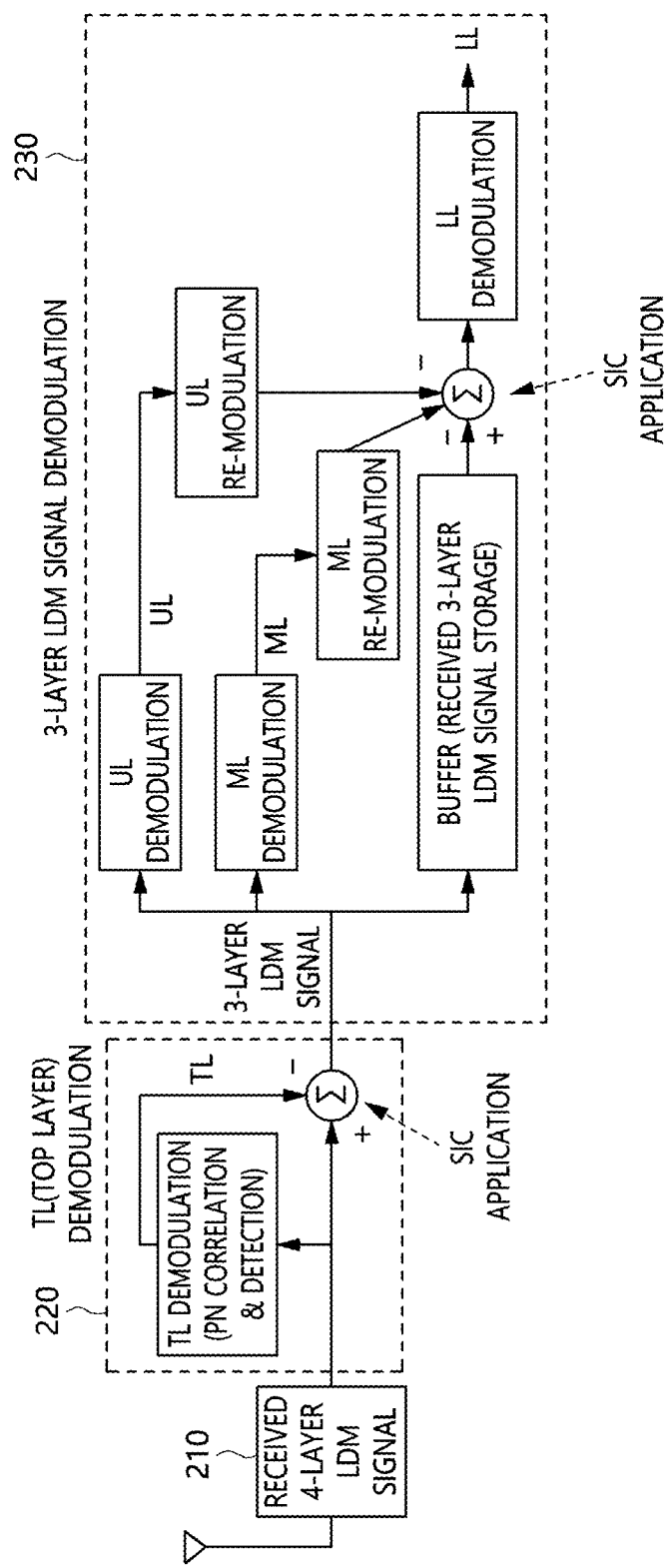
FIG. 12 is a block diagram illustrating an apparatus for receiving a 4-layer layered-division multiplexing signal according to an embodiment of the present invention.

FIG. 12 is a block diagram illustrating an apparatus for receiving a 4-layer LDM signal according to an embodiment of the present invention.

Referring to FIG. 12, the apparatus for receiving a 4-layer LDM signal according to the embodiment of the present invention includes a reception unit 210, a PN sequence detection unit 220, and an LDM demodulation unit 230.

The reception unit 210 may receive a 4-layer LDM signal.

Here, the reception unit 210 may receive the 4-layer LDM signal using an Orthogonal Frequency Division Multiplexing (OFDM) scheme.

The PN sequence detection unit 220 may detect a PN sequence from the 4-layer LDM signal, and may cancel the PN sequence from the 4-layer LDM signal.

Here, the PN sequence detection unit 220 may detect the PN sequence from the 4-layer LDM signal by calculating a correlation between the 4-layer LDM signal and the PN sequence.

Here, the PN sequence detection unit 220 may detect the PN sequence, and may receive PN sequence information of a fourth layer signal.

Here, the PN sequence detection unit 220 may cancel the PN sequence from the 4-layer LDM signal using a successive interference cancellation (SIC) technique.

Here, when there are multiple PN sequences, the PN sequence detection unit 220 may calculate correlation values between the multiple PN sequences and the 4-layer LDM signal, and may determine a PN sequence corresponding to a maximum correlation value, among the calculated correlation values, to be the detected PN sequence.

Here, when there are multiple PN sequences, the PN sequence detection unit 220 may calculate correlation values between the multiple PN sequences and the 4-layer LDM signal, and may determine a PN sequence corresponding to a correlation value equal to or greater than a preset correlation value, among the calculated correlation values, to be the detected PN sequence.

Here, the PN sequence detection unit 220 may reconstruct the 3-layer LDM signal by cancelling the signal component of the PN sequence, calculated by multiplying a preset injection level and a channel estimation vector by the PN sequence, from the 4-layer LDM signal.

The LDM demodulation unit 230 may demodulate the 3-layer LDM signal in which the PN sequence has been cancelled from the 4-layer LDM signal, and may then reconstruct the demodulated 3-layer LDM signal into three layer signals.

In this case, the LDM demodulation unit 230 may reconstruct a second layer signal that is Amplitude Shift Keying (ASK)-modulated using the magnitude of a first layer signal that is Quadrature Phase Shift Keying (QPSK) modulated, among three layer signals contained in the 3-layer LDM signal.

Here, the LDM demodulation unit 230 may re-modulate the first layer signal and the second layer signal, and may reconstruct a third layer signal, among the three layer signals, by cancelling the re-modulated first layer signal and second layer signal from the 3-layer LDM signal using a successive interference cancellation (SIC) technique.

Here, for the UL QPSK signal of the received 3-layer LDM modulation signal, the LDM demodulation unit 230 may receive a UL signal by treating an ML signal and an LL signal as noise.

At this time, since ASK modulation applied to the ML has information only in the magnitude of a signal, the LDM demodulation unit 230 may cancel a UL signal component from the received 3-layer LDM modulation signal from the standpoint of the ML signal if only the signal magnitude of the UL signal is subtracted from the received 3-layer LDM modulation signal, without receiving and re-modulating the UL signal, by utilizing information indicating that the magnitude of the UL QPSK signal is "1".

Here, for the ML ASK signal of the received 3-layer LDM modulation signal, the LDM demodulation unit 230 may receive the ML signal by cancelling the upper layer (UL) signal component using a SIC technique and treating the LL signal as noise.

The LDM demodulation unit 230 may reconstruct and re-modulate the upper layer (UL) and the ML signal from the received 3-layer LDM modulation signal, and may reconstruct the LL signal after cancelling the two signals using the SIC technique.

Here, the LDM demodulation unit 230 may simultaneously receive the UL signal and the ML signal, simultaneously re-modulate the UL signal and the ML signal so as to receive the LL signal, and then reconstruct the LL signal by cancelling the UL and ML signal components from the received 3-layer LDM signal.

Figure 13:
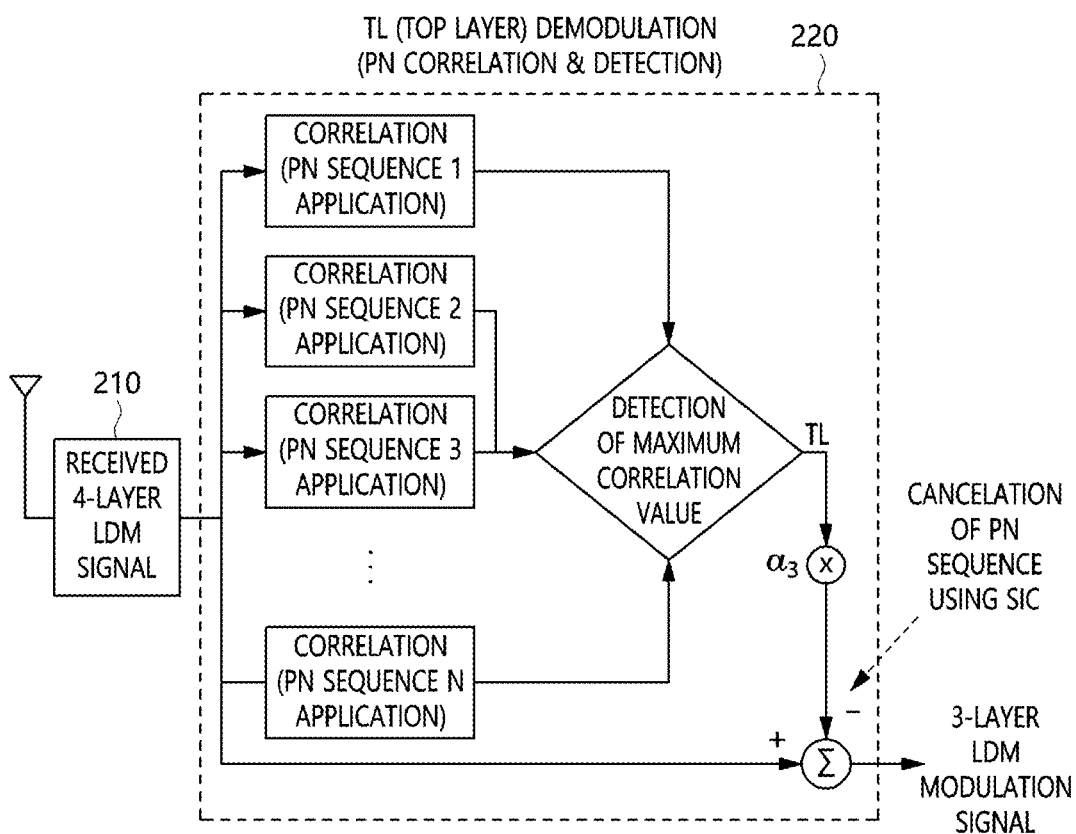
FIG. 13 is a diagram illustrating a process in which the PN sequence detection unit of FIG. 12 detects a PN sequence.

FIG. 13 is a diagram illustrating a process in which the PN sequence detection unit of FIG. 12 detects a PN sequence.

Referring to FIG. 13, the PN sequence detection unit 220 may receive information about the number of PN sequences in accordance with the modulation order of QAM. The PN sequence detection unit 220 may correspond to QAM modulation depending on the number of PN sequences.

When different PN sequences of two types, having the same length, are applied, the PN sequence detection unit 220 may correspond to binary phase shift keying (BPSK) modulation of QAM. Since BPSK modulation has two different constellations, the same transfer rate as that of BPSK modulation may be obtained by mapping the two different PN sequences to the two BPSK constellations, respectively.

When different PN sequences of four types, having the same length, are applied, the PN sequence detection unit 220 may correspond to Quadrature Phase Shift Keying (QPSK) modulation of QAM. Since QPSK modulation has four different constellations, the same transfer rate as that of QPSK modulation may be realized by mapping the four different PN sequences to the four QPSK constellations, respectively.

When different PN sequences of 16 types, having the same length, are applied, the PN sequence detection unit 220 may correspond to 16-QAM modulation of QAM. Since 16-QAM modulation has 16 different constellations, the same transfer rate as that of 16-QAM modulation may be realized by mapping the 16 different PN sequences to the 16 16-QAM constellations, respectively.

When different PN sequences of 64 types, having the same length, are applied, the PN sequence detection unit 220 may correspond to 64-QAM modulation of QAM. Since 64-QAM modulation has 64 different constellations, the same transfer rate as that of 64-QAM modulation may be realized by mapping the 64 different PN sequences to the 64 64-QAM constellations, respectively.

When different PN sequences of $2^n$ types, having the same length, are applied, the PN sequence detection unit 220 may correspond to $2^n$-QAM modulation of QAM. Since $2^n$-QAM modulation has $2^n$ different constellations, the 4-layer LDM signal may have the same transfer rate as that of $2^n$ QAM modulation by mapping the $2^n$ different PN sequences to the $2^n 2^n$-QAM constellations, respectively.

That is, the PN sequence detection unit 220 may determine the transfer rate of the 4-layer LDM modulation signal so that the 4-layer LDM modulation signal has the same transfer rate as that of $2^n$-QAM modulation by mapping $2^n$ different PN sequences to $2^n$ $2^n$-QAM constellations, respectively.

Here, the PN sequence detection unit 220 may determine the transfer rate of the 4-layer LDM modulation signal to have the same transfer rate as that of the n-th order QAM modulation by applying the same number of PN sequences as the number of constellations of the n-th order QAM modulation having n constellations.

Further, assuming that the PN sequence detection unit 220 applies $2^n$ PN sequences to PN sequence-based 4-layer LDM modulation and maps the $2^n$ PN sequences to constellations of the n-th order QAM modulation, each of $2^n$ different PN sequences may transmit n bits.

The PN sequence detection unit 220 may take correlations between the received 4-layer LDM modulation signal and $2^n$ PN sequences, and may determine a PN sequence for which the maximum value, among the $2^n$ correlation values, is obtained, to be the transmitted PN sequence.

Further, when a correlation value with a specific PN sequence exceeds a preset threshold value while taking correlations with the PN sequences, the PN sequence detection unit 220 does not obtain correlations with the remaining PN sequences, and may determine the PN sequence, with which the correlation value exceeds the threshold value, to be the transmitted PN sequence. In this way, the effect of reducing a computational load may be obtained.

The PN sequence detection unit 220 may cancel the detected PN sequence from the received 4-layer LDM modulation signal.

When the transmitted PN sequence is detected, the PN sequence detection unit 220 may multiply an injection level $\alpha_3$, applied to the insertion of a fourth layer TL PN sequence signal, by the detected PN sequence, and may cancel the corresponding PN sequence signal component from the received 4-layer LDM signal using SIC technique.

Here, the PN sequence detection unit 220 may use the SIC technique in such a way as to multiply a channel estimation vector by a $\alpha_3$TL signal and cause the $\alpha_3$TL signal to have the channel distortion of the received signal, so that the PN sequence signal component is cancelled from the 4-layer LDM modulation signal, thus obtaining a 3-layer LDM modulation signal.

A 3-layer LDM modulation process to which ASK modulation is applied may be performed from the 3-layer LDM modulation signal obtained in this way.

The transfer rate obtained when information is transmitted a PN sequence using a method corresponding to QAM modulation may be represented as follows.

The case where a 16K-FFT mode of a broadcasting system is used will be described by way of example. The length of one OFDM symbol in the 16K-FFT mode of the broadcasting system has a time interval of $T_u$=2370.37 μsec. Therefore, about 421.88 OFDM symbols may be present per second.

Here, a transfer rate that can be realized depending on the number of PN sequences to be added, that is, a QAM modulation order, may be represented as follows.

When two PN sequences having the same length are used, the PN sequences correspond to BPSK modulation having two output constellations, and thus one PN sequence may have a transfer rate of 1 bit identical to that of BPSK. In this case, the transfer rates of PN sequences are represented as follows.

The transfer rate realized when PN 1024 is applied may be represented by the case where a PN sequence having a length of 1024 is applied. Since 12 PN sequences may be added to one OFDM symbol, there may be 5062.56 (=421.88×12) PN sequences as PN sequences per second. Therefore, a data transfer rate may be realized as about 5 Kbps by the following equation:

5062.56 PN/sec×1 bit/PN=5062.56 bit/sec

Figure 15:
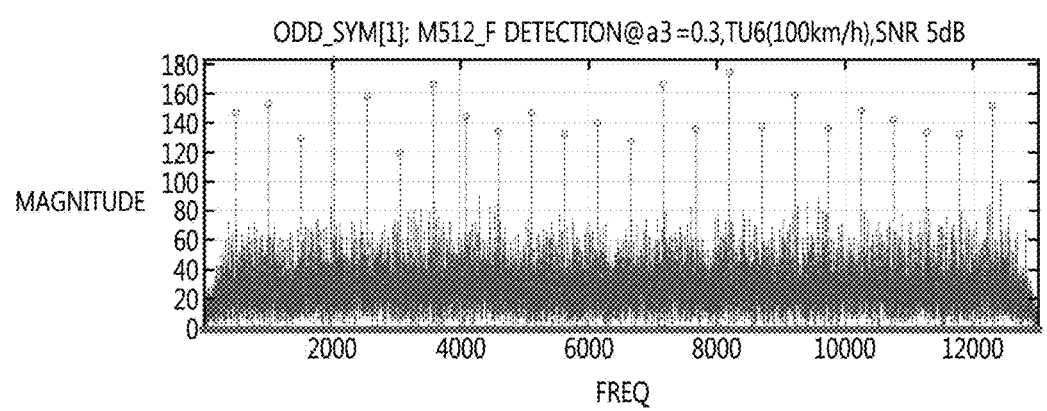

The transfer rate realized when PN 512 is applied may be represented by the case where a PN sequence having a length of 512 is applied. As illustrated in FIG. 15, since 24 PN sequences may be added to one OFDM symbol, there may be 10,125.12 (=421.88×24) PN sequences as PN sequences per second. Therefore, the data transfer rate may be realized as about 10 Kbps by the following equation:

10,125.12 PN/sec×1 bit/PN=10,125.12 bit/sec

When four PN sequences having the same length are used, the PN sequences correspond to QPSK modulation having four output constellations, and thus one PN sequence may have a transfer rate of 2 bits identical to that of QPSK. In this case, the transfer rates of PN sequences are represented as follows.

The transfer rate realized when PN 1024 is applied may represent the case where a PN sequence having a length of 1024 is applied, and 12 PN sequences may be added to one OFDM symbol, and thus there may be 5062.56 (=421.88×12) PN sequences as PN sequences per second. Therefore, the data transfer rate may be realized as about 10 Kbps by the following equation:

5062.56 PN/sec×2 bit/PN=10,125.12 bit/sec

The transfer rate realized when PN 512 is applied may represent the case where a PN sequence having a length of 512 is applied, and 24 PN sequences may be added to one OFDM symbol, and thus there may be 10,125.12(=421.88×24) PN sequences as PN sequences per second. Therefore, the data transfer rate may be realized as about 20 Kbps by the following equation:

10,125.12 PN/sec×2 bit/PN=20,250.24 bit/sec

Since the case where 16 PN sequences having the same length are used corresponds to 16-QAM modulation having 16 output constellations, one PN sequence may have a transfer rate of 4 bits identical to that of 16-QAM. In this case, the transfer rates of PN sequences are represented as follows.

The transfer rate realized when PN 1024 is applied may represent the case where a PN sequence having a length of 1024 is applied, and 12 PN sequences may be added to one OFDM symbol, and thus there may be 5062.56(=421.88×12) PN sequences as PN sequences per second. Therefore, the data transfer rate may be realized as about 20 Kbps by the following equation:

5062.56 PN/sec×4 bit/PN=20,250.24 bit/sec

The transfer rate realized when PN 512 is applied may represent the case where a PN sequence having a length of 512 is applied, and 24 PN sequences may be added to one OFDM symbol, and thus there may be 10,125.12(=421.88×24) PN sequences as PN sequences per second. Therefore, the data transfer rate may be realized as about 40 Kbps by the following equation:

10,125.12 PN/sec×4 bit/PN=40,500.48 bit/sec

Since the case where 64 PN sequences having the same length are used corresponds to 64-QAM modulation having 64 output constellations, one PN sequence may have a transfer rate of 6 bits identical to that of 64-QAM. In this case, the transfer rates of PN sequences are represented as follows.

The transfer rate realized when PN 1024 is applied may represent the case where a PN sequence having a length of 1024 is applied, and 12 PN sequences may be added to one OFDM symbol, and thus there may be 5062.56(=421.88×12) PN sequences as PN sequences per second. Therefore, the data transfer rate may be realized as about 30 Kbps by the following equation:

5062.56 PN/sec×6 bit/PN=30,375.36 bit/sec

The transfer rate realized when PN 512 is applied may represent the case where a PN sequence having a length of 512 is applied, and 24 PN sequences may be added to one OFDM symbol, and thus there may be 10,125.12(=421.88× 24) PN sequences as PN sequences per second. Therefore, the data transfer rate may be realized as about 60 Kbps by the following equation:

10,125.12 PN/sec×6 bit/PN=60,750.72 bit/sec

As described above, the shorter the length of the PN sequence to be applied, the greater the number of PN sequences that are transmitted per second, and thus the data transfer rate may be increased. In contrast, as the length of the PN sequence is shorter, it may be more difficult for a reception stage to detect a PN sequence, thus deteriorating reception performance. Therefore, in consideration of the status of channels through which PN sequences are transmitted, there may be a negotiation between the transfer rate of PN sequences and reception performance.

Figure 14:
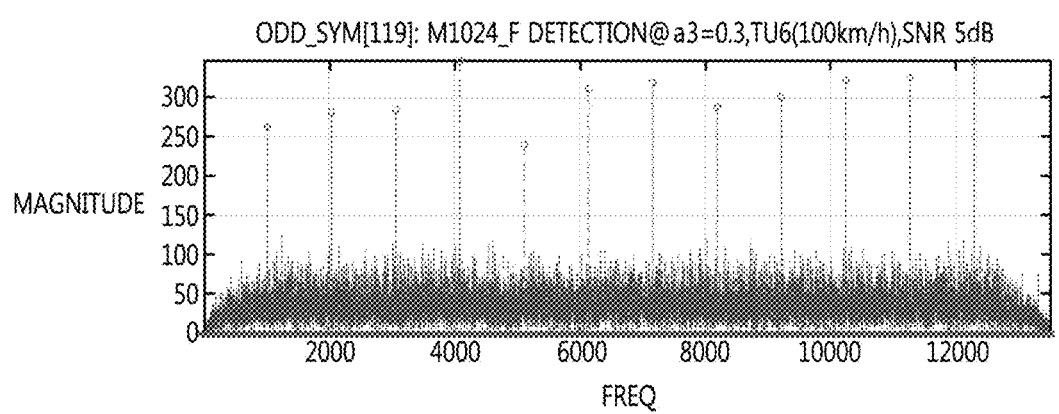
FIGS. 14 and 15 are graphs illustrating the results of detecting a PN sequence from a received 4-layer layered division multiplexing signal according to an embodiment of the present invention.

FIGS. 14 and 15 are graphs illustrating the results of detecting a PN sequence from a received 4-layer layered-division multiplexing signal according to an embodiment of the present invention.

Referring to FIG. 14, it can be seen that, when PN sequences, each having a length of 1024, are applied, the results of detecting PN sequences by a reception stage are depicted. In a transmission stage, a magnitude corresponding to 0.3 of the magnitude of a 3-layer LDM modulation signal has been applied to the signal magnitude of the PN sequence. Further, it is assumed that a transmission channel, through which a transmission signal passes, receives a proposed PN sequence-based 4-layer LDM modulation signal in an environment in which a receiver is moving at a speed of 100 Km/h in a typical urban (TU)-6 channel model for simulating a typical urban environment defined in digital video broadcasting (DVB). Further, FIG. 14 illustrates an example in which, when a signal-to-noise ratio (SNR) of the 4-layer LDM modulation signal and noise is 5 dB, PN sequences are detected by obtaining correlate peak values through correlations between the received 4-layer LDM modulation signal and PN sequences.

Referring to FIG. 15, it can be seen that, when PN sequences, each having a length of 512, are applied, the results of detecting PN sequences by a reception stage are depicted. It can be seen that the number of PN sequences, each having a length of 512, that can be added to one OFDM symbol, is twice as large as that of PN sequences, each having a length of 1024, if the numbers of correlate peak values shown in FIGS. 14 and 15 are compared with each other. That is, it can be seen that, in the case of PN 1024 of FIG. 14, 12 correlate peak values appear, whereas, in the case of PN 512 of FIG. 15, 24 correlate peak values appear.

The shorter the length of the PN sequence to be applied, the greater the number of PN sequences that can be added to one OFDM symbol, and the greater the number of PN sequences that are added, the larger the amount of data that can be transmitted. Therefore, from the standpoint of a data transfer rate, a PN sequence having a smaller length may be more profitable.

In contrast, when detected correlate peak values are compared with each other, PN 1024 has correlate peak values, the magnitudes of which range from a minimum of about 240 to a maximum of about 400, and PN 512 has correlate peak values, the magnitudes of which range from a minimum of about 120 to a maximum of about 180. Thereby, it can be seen that PN 1024 has correlate peak values, the magnitudes of which are about twice as high as those of PN 512. In the case where a reception channel is inferior or is combined with a condition in which SNR becomes lower due to the small magnitude of a transmission signal, the reception performance of PN 1024 having higher correlate peak values may be superior.

When a transmission channel to be applied has low distortion and high SNR, reception performance of PN sequences may be excellent even if PN sequences having a small length are applied. In this case, because a PN sequence having a small length is advantageous from the aspect of a data transfer rate, it may be profitable to apply a shorter PN sequence. In contrast, when a transmission channel has large distortion and has low SNR, it is difficult to detect a PN sequence, and thus it may be profitable to apply a long PN sequence from the standpoint of stabilized reception. Here, when a PN sequence having a small length is applied, the possibility that a PN sequence will not be received may increase.

The apparatus for transmitting and receiving a 4-layer LDM signal according to embodiments of the present invention may transmit and receive a fourth layer signal having a minimum magnitude that is newly added while a fourth layer signal to be newly added is added at a minimum magnitude so that degradation of performance of a 3-layer LDM modulation signal is minimized.

Figure 16:
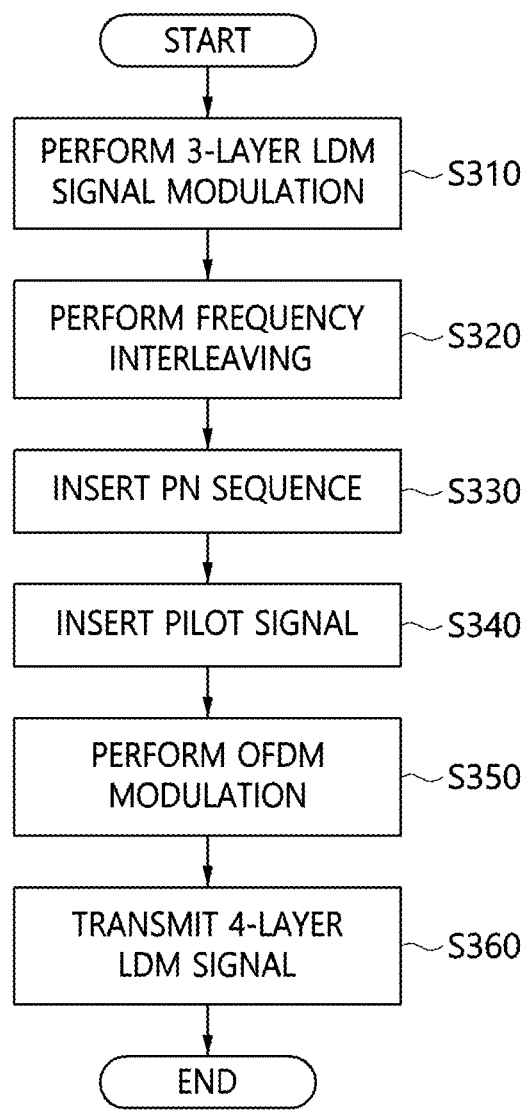
FIG. 16 is an operation flowchart illustrating a method for transmitting a 4-layer layered-division multiplexing signal according to an embodiment of the present invention.

FIG. 16 is an operation flowchart illustrating a method for transmitting a 4-layer LDM signal according to an embodiment of the present invention.

Referring to FIG. 16, the 4-layer LDM signal transmission method according to the embodiment of the present invention may perform 3-layer LDM signal modulation at step S310.

At step S310, a 3-layer LDM signal may be generated by performing layered-division multiplexing modulation on three layer signals.

Next, the 4-layer LDM signal transmission method according to the embodiment of the present invention may perform frequency interleaving at step S320.

That is, at step S320, frequency interleaving may be performed on the 3-layer LDM signal.

Further, the 4-layer LDM signal transmission method according to the embodiment of the present invention may insert a PN sequence at step S330.

That is, at step S330, a 4-layer LDM signal may be generated by inserting a pseudo random noise (PN) sequence into the 3-layer LDM signal.

Here, at step S330, the PN sequence may be inserted into a data subcarrier of the 3-layer LDM signal.

Here, at step S330, an asterion of a Binary Phase Shift Keying (BPSK) constellation of the PN sequence may be inserted into at least one asterion of a constellation of the 3-layer LDM signal.

Here, at step S330, when there are multiple PN sequences, the transfer rate of the modulation order of QAM corresponding to the number of PN sequences may be determined to be the transfer rate of the 4-layer LDM signal.

Then, the 4-layer LDM signal transmission method according to the embodiment of the present invention may insert a pilot signal at step S340.

That is, at step S340, the pilot signal may be inserted into the 4-layer LDM signal.

Next, the 4-layer LDM signal transmission method according to the embodiment of the present invention may perform OFDM modulation at step S350.

That is, at step S350, OFDM modulation may be performed on the 4-layer LDM signal.

Furthermore, the 4-layer LDM signal transmission method according to the embodiment of the present invention may transmit the 4-layer LDM signal at step S360.

That is, at step S360, the 4-layer Layered-Division Multiplexing (LDM) signal for four layers may be transmitted.

In detail, at step S360, the 4-layer LDM signal may be transmitted using an OFDM scheme.

Figure 17:
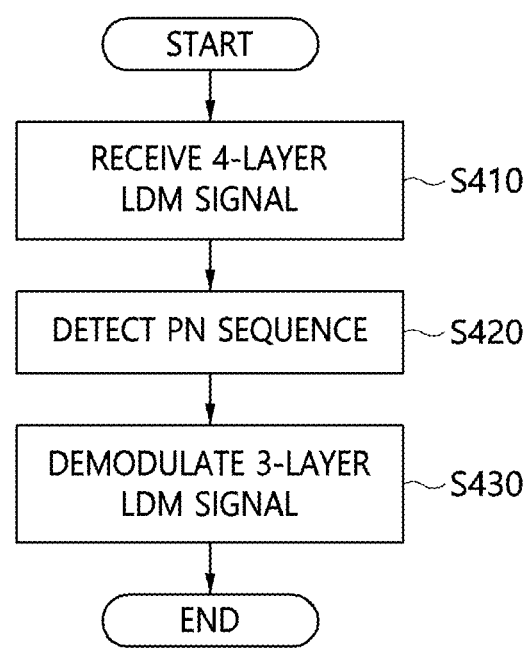
FIG. 17 is an operation flowchart illustrating a method for receiving a 4-layer layered-division multiplexing signal according to an embodiment of the present invention.

FIG. 17 is an operation flowchart illustrating a method for receiving a 4-layer LDM signal according to an embodiment of the present invention.

Referring to FIG. 17, first, the 4-layer LDM signal reception method according to the embodiment of the present invention may receive a 4-layer LDM signal at step S410.

That is, at step S410, the 4-layer Layered-Division Multiplexing (LDM) signal for four layers may be received.

Here, at step S410, the 4-layer LDM signal may be received using an Orthogonal Frequency Division Multiplexing (OFDM) scheme.

Next, the 4-layer LDM signal reception method according to the embodiment of the present invention may detect a PN sequence at step S420.

That is, at step S420, the PN sequence may be detected from the 4-layer LDM signal, and may be cancelled from the 4-layer LDM signal.

Here, at step S420, the PN sequence may be detected from the 4-layer LDM signal by calculating a correlation between the 4-layer LDM signal and the PN sequence.

Here, at step S420, the PN sequence may be detected, and PN sequence signal information of a fourth layer signal may be received.

Here, at step S420, the PN sequence may be cancelled from the 4-layer LDM signal using a successive interference cancellation (SIC) technique.

In detail, at step S420, when there are multiple PN sequences, correlation values between multiple PN sequences and the 4-layer LDM signal may be calculated, and a PN sequence corresponding to a maximum correlation value, among the calculated correlation values, may be determined to be the detected PN sequence.

In detail, at step S420, when there are multiple PN sequences, correlation values between multiple PN sequences and the 4-layer LDM signal may be calculated, and a PN sequence corresponding to a correlation value equal to or greater than a preset correlation value, among the calculated correlation values, may be determined to be the detected PN sequence.

Here, at step S420, the 3-layer LDM signal may be reconstructed by cancelling the signal component of the PN sequence, calculated by multiplying a preset injection level and a channel estimation vector by the PN sequence, from the 4-layer LDM signal.

Next, the 4-layer LDM signal reception method according to the embodiment of the present invention may demodulate the 3-layer LDM signal at step S430.

That is, at step S430, the 3-layer LDM signal may be reconstructed into three layer signals by demodulating the 3-layer LDM signal in which the PN sequence has been cancelled from the 4-layer LDM signal.

Here, at step S430, a second layer signal that is Amplitude Shift Keying (ASK)-modulated may be reconstructed using the magnitude of a first layer signal that is Quadrature Phase Shift Keying (QPSK) modulated, among three layer signals contained in the 3-layer LDM signal.

At step S430, the first layer signal and the second layer signal may be re-modulated, and a third layer signal, among the three layer signals, may be reconstructed by cancelling the re-modulated first layer signal and second layer signal from the 3-layer LDM signal using a successive interference cancellation (SIC) technique.

Here, at step S430, for the UL QPSK signal of the received 3-layer LDM modulation signal, a UL signal may be received by treating an ML signal and an LL signal as noise Here, at step S430, since ASK modulation applied to the ML has information only in the magnitude of a signal, a UL signal component may be cancelled from the received 3-layer LDM modulation signal from the standpoint of the ML signal if only the signal magnitude of the UL signal is subtracted from the received 3-layer LDM modulation signal, without receiving and re-modulating the UL signal, by utilizing information indicating that the magnitude of the UL QPSK signal is "1".

Here, at step S430, for the ML ASK signal of the received 3-layer LDM modulation signal, the ML signal may be received by cancelling the upper layer (UL) signal component using a SIC technique and treating the LL signal as noise.

Further, at step S430, the upper layer (UL) and the ML signal may be reconstructed and re-modulated from the received 3-layer LDM modulation signal, and the LL signal may be reconstructed after the two signals have been cancelled using the SIC technique.

Here, at step S430, the UL signal and the ML signal may be simultaneously received, the UL signal and the ML signal may be simultaneously re-modulated so as to receive the LL signal, and then the LL signal may be reconstructed by cancelling the UL and ML signal components from the received 3-layer LDM signal.

Figure 18:
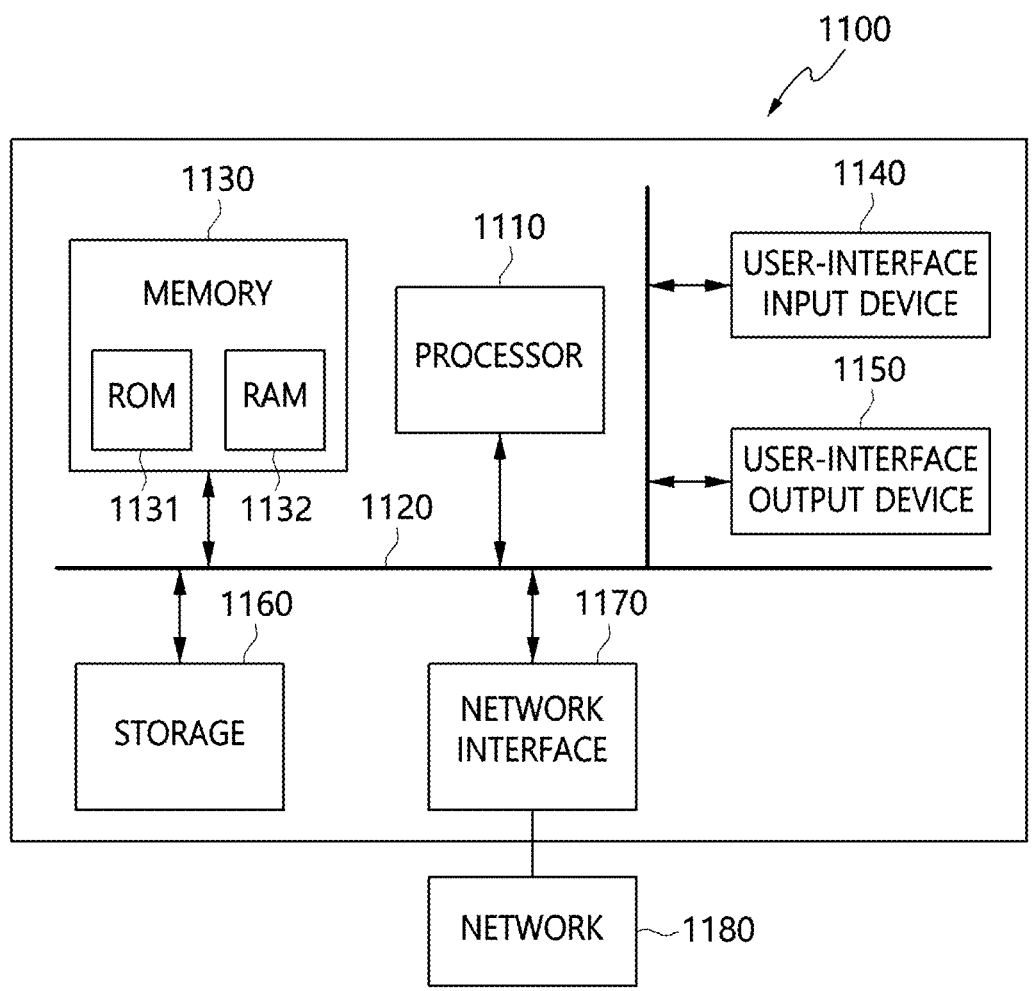
FIG. 18 is a block diagram illustrating a computer system according to an embodiment of the present invention.

FIG. 18 is a diagram illustrating a computer system according to an embodiment of the present invention.

Referring to FIG. 18, each of an apparatus for transmitting a 4-layer LDM signal and an apparatus for receiving a 4-layer LDM signal according to embodiments of the present invention may be implemented in a computer system 1100, such as a computer-readable storage medium. As illustrated in FIG. 18, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus and method for transmitting and receiving a 4-layer LDM signal according to embodiments of the present invention may transmit and receive a 4-layer LDM signal into which a PN sequence is inserted as a fourth layer sequence in order to satisfy one condition that, when a new modulation signal is applied as a fourth layer signal, the fourth layer signal must have a sufficient signal magnitude to be received, and an additional condition that a fourth layer signal to be newly added must have a sufficiently small signal magnitude so as to minimize influence exerted on an existing 3-layer LDM modulation signal.

When a PN sequence has a sufficiently large length, the PN sequence may be detected even when SNR is very low, that is, when the magnitude of the PN sequence is very small. The influence of the PN sequence on 3-layer LDM modulation may be minimized by applying a PN sequence having a small signal magnitude. Further, even if the magnitude of a signal is small, a reception stage may detect a PN sequence which is a fourth layer signal. Therefore, the PN sequence may satisfy the conditions required in 4-layer LDM modulation.

A first condition in PN sequence-based 4-layer LDM modulation is that the PN sequence to be applied as the fourth layer signal must have a receivable magnitude. A second condition is that the PN sequence to be applied as a fourth layer signal must have almost no influence on the reception of a 3-layer LDM modulation signal.

In order to satisfy the first condition that the PN sequence is to be receivable, the PN sequence must have a minimum magnitude sufficient to be detected by the reception stage in consideration of the length of the PN sequence to be applied. If the magnitude of the PN sequence is too small to be detected by the reception stage, it may be impossible to perform 4-layer LDM modulation itself. Therefore, a fourth layer PN sequence signal to be newly added must have a magnitude sufficient to be detected by the reception stage.

In order to satisfy the second condition that a PN sequence must have almost no influence on the reception of a 3-layer LDM modulation signal, no PN sequence needs only to be present in the 3-layer LDM modulation signal. That is, when a PN sequence signal component, which is a newly added fourth layer signal, is cancelled from a received 4-layer LDM modulation signal, almost no PN sequence signal is present when an existing 3-layer LDM modulation signal is received, thus minimizing the influence of a PN sequence. Here, depending on how cancelation performance for a PN sequence signal is excellent, the magnitudes of the remaining PN sequence signals may be determined. Since the remaining PN sequence signals influence, as noise, a process for receiving a 3-layer LDM modulation signal, it is important to minimize the magnitudes of the remaining PN sequence signals. By means of a process for cancelling a PN sequence signal which is a newly added fourth layer signal from a received 4-layer LDM modulation signal, the influence of the PN sequence signal on the reception of an existing 3-layer LDM modulation signal may be minimized.

The apparatus and method for transmitting and receiving a 4-layer LDM signal according to embodiments of the present invention may be configured such that, when a PN sequence signal is cancelled from a received 4-layer LDM modulation signal using SIC technique, a PN sequence signal component included in the received 4-layer LDM modulation signal may be cancelled without errors only when a PN sequence having the same waveform as the PN sequence signal included in the received 4-layer LDM modulation signal is generated. Because PN sequence signal components remaining after PN sequences have been cancelled act as noise on the 3-layer LDM modulation signal, the influence of the PN sequence on the reception of a 3-layer LDM modulation signal may be decreased as the magnitudes of the remaining PN sequence signals are smaller.

The apparatus and method for transmitting and receiving a 4-layer LDM signal according to embodiments of the present invention may accurately estimate the channel characteristics of a received 4-layer LDM modulation signal so as to generate a PN sequence signal having the same waveform as the PN sequence signal included in the received 4-layer LDM modulation signal.

The apparatus and method for transmitting and receiving a 4-layer LDM signal according to embodiments of the present invention may generate a PN sequence signal having the same waveform as the PN sequence signal included in the received 4-layer LDM signal when channel estimation performance is better, and may accurately cancel the PN sequence.

As a result, the apparatus and method for transmitting and receiving a 4-layer LDM signal according to embodiments of the present invention may minimize the magnitudes of the remaining PN sequence signals and also minimize the influence of the remaining PN sequence signals on the reception of a 3-layer LDM modulation signal.

Further, the apparatus and method for transmitting and receiving a 4-layer LDM signal according to embodiments of the present invention may accurately estimate the channel characteristics of a received 4-layer LDM modulation signal so as to generate a PN sequence having the same waveform as the PN sequence signal included in the received 4-layer LDM modulation signal.

Furthermore, the apparatus and method for transmitting and receiving a 4-layer LDM signal according to embodiments of the present invention may realize the same transfer rate as n-th order QAM modulation by applying a number of PN sequence signals, having the same length, identical to the number of n-th order QAM modulation constellations. Therefore, depending on the allowable range of the complexity of implementation of hardware in a reception stage, the number of PN sequences to be applied may be increased, and thus a higher data transfer rate may be realized.

The present invention may perform 4-layer Layered-Division Multiplexing (LDM) modulation by adding a new signal to a 3-layer LDM signal.

Further, the present invention may transmit and receive a 4-layer LDM signal in which a new signal is added to a 3-layer LDM signal without influencing transmission/reception performance of the 3-layer LDM signal.

Furthermore, the present invention may transmit and receive a 4-layer LDM signal at a very low Signal-to-Noise Ratio (SNR) and apply the 4-layer LDM signal to mobile transmission and reception.

As described above, in the apparatus and method for transmitting and receiving a 4-layer LDM signal according to the present invention, the configurations and schemes in the above-described embodiments are not limitedly applied, and some or all of the above embodiments can be selectively combined and configured such that various modifications are possible.

What is claimed is:

1. An apparatus for receiving a 4-layer Layered-division Multiplexing (LDM) signal, comprising:
   a reception unit for receiving a 4-layer LDM signal;
   a PN sequence detection unit for detecting a PN sequence from the 4-layer LDM signal, and cancelling the PN sequence from the 4-layer LDM signal; and
   an LDM demodulation unit for reconstructing a 3-layer LDM signal, in which the PN sequence is cancelled from the 4-layer LDM signal, into three layer signals.

2. The apparatus of claim 1, wherein the PN sequence detection unit detects the PN sequence from the 4-layer LDM signal by calculating a correlation between the 4-layer LDM signal and the PN sequence.

3. The apparatus of claim 2, wherein the PN sequence detection unit cancels the PN sequence from the 4-layer LDM signal using a successive interference cancellation (SIC) technique.

4. The apparatus of claim 3, wherein the PN sequence detection unit is configured to, when the PN sequence includes multiple PN sequences, calculate correlation values between the multiple PN sequences and the 4-layer LDM signal, and determine a PN sequence corresponding to a maximum correlation value, among the correlation values, to be the detected PN sequence.

5. The apparatus of claim 3, wherein the sequence detection unit is configured to, when the PN sequence includes multiple PN sequences, calculate correlation values between the multiple PN sequences and the 4-layer LDM signal, and determine a PN sequence corresponding to a correlation value equal to or greater than a preset correlation value, among the correlation values, to be the detected PN sequence.

6. The apparatus of claim 2, wherein the PN sequence detection unit reconstructs the 3-layer LDM signal by cancelling a signal component of the PN sequence, calculated by multiplying a preset injection level and a channel estimation vector by the PN sequence, from the 4-layer LDM signal.

7. The apparatus of claim 1, wherein the LDM demodulation unit reconstructs an Amplitude Shift Keying (ASK)-modulated second layer signal, using a magnitude of a Quadrature Phase Shift Keying (QPSK)-modulated first layer signal, among the three layer signals in the 3-layer LDM signal.

8. The apparatus of claim 7, wherein LDM demodulation unit re-modulates the first layer signal and the second layer signal, and reconstructs a third layer signal, among the three layer signals, by cancelling the re-modulated first layer signal and second layer signal from the 3-layer LDM signal using a successive interference cancellation (SIC) technique.

9. A method for receiving a 4-layer Layered-Division Multiplexing (LDM) signal, the method being performed by a 4-layer LDM signal reception apparatus, the method comprising:
  receiving a 4-layer LDM signal;
  detecting a PN sequence from the 4-layer LDM signal and cancelling the PN sequence from the 4-layer LDM signal; and
  reconstructing a 3-layer LDM signal, in which the PN sequence is cancelled from the 4-layer LDM signal, into three layer signals.

10. The method of claim 9, wherein cancelling the PN sequence is configured to detect the PN sequence from the 4-layer LDM signal by calculating a correlation between the 4-layer LDM signal and the PN sequence.

11. The method of claim 10, wherein cancelling the PN sequence is configured to cancel the PN sequence from the 4-layer LDM signal using a successive interference cancellation (SIC) technique.

12. The method of claim 11, wherein cancelling the PN sequence is configured to, when the PN sequence includes multiple PN sequences, calculate correlation values between the multiple PN sequences and the 4-layer LDM signal, and determine a PN sequence corresponding to a maximum correlation value, among the correlation values, to be the detected PN sequence.

13. The method of claim 11, wherein cancelling the PN sequence is configured to, when the PN sequence includes multiple PN sequences, calculate correlation values between the multiple PN sequences and the 4-layer LDM signal, and determine a PN sequence corresponding to a correlation value equal to or greater than a preset correlation value, among the correlation values, to be the detected PN sequence.

14. The method of claim 10, wherein cancelling the PN sequence is configured to reconstruct the 3-layer LDM signal by cancelling a signal component of the PN sequence, calculated by multiplying a preset injection level and a channel estimation vector by the PN sequence, from the 4-layer LDM signal.

15. The method of claim 9, wherein reconstructing the 3-layer LDM signal into the three layer signals is configured to reconstruct an Amplitude Shift Keying (ASK)-modulated second layer signal, using a magnitude of a Quadrature Phase Shift Keying (QPSK)-modulated first layer signal, among the three layer signals in the 3-layer LDM signal.

16. The method of claim 15, wherein reconstructing the 3-layer LDM signal into the three layer signals is configured to re-modulate the first layer signal and the second layer signal and to reconstruct a third layer signal, among the three layer signals, by cancelling the re-modulated first layer signal and second layer signal from the 3-layer LDM signal using a successive interference cancellation (SIC) technique.

* * * * *